United States Patent
Kim et al.

(10) Patent No.: US 10,097,310 B2
(45) Date of Patent: Oct. 9, 2018

(54) DEVICE AND METHOD FOR TRANSMITTING/RECEIVING A PLURALITY OF ENCODED DATA PACKETS

(71) Applicants: SK TELECOM CO., LTD., Seoul (KR); Korea University Research and Business Foundation, Seoul (KR)

(72) Inventors: Young Lak Kim, Yongin-si (KR); Jin Hyo Park, Seoul (KR); Young Kil Suh, Mokpo-si (KR); Jun Heo, Seoul (KR)

(73) Assignees: SK TELECOM CO., LTD., Seoul (KR); Korea University Research and Business Foundation, Seoul (KR)

( * ) Notice: Subject to any disclaimer, the term of this patent is extended or adjusted under 35 U.S.C. 154(b) by 313 days.

(21) Appl. No.: 14/513,623

(22) Filed: Oct. 14, 2014

(65) Prior Publication Data

US 2015/0033100 A1    Jan. 29, 2015

Related U.S. Application Data

(63) Continuation of application No. PCT/KR2013/003082, filed on Apr. 12, 2013.

(30) Foreign Application Priority Data

Apr. 12, 2012 (KR) .......................... 10-2012-0038022

(51) Int. Cl.
*H04L 1/00* (2006.01)
*G06F 11/10* (2006.01)
*H04L 1/02* (2006.01)

(52) U.S. Cl.
CPC ............ *H04L 1/0041* (2013.01); *G06F 11/10* (2013.01); *H04L 1/0057* (2013.01); *H04L 1/02* (2013.01)

(58) Field of Classification Search
None
See application file for complete search history.

(56) References Cited

U.S. PATENT DOCUMENTS

| 5,541,995 A | * | 7/1996 | Normile | ................. H04L 9/065 |
| | | | | 380/277 |
| 9,166,804 B2 | * | 10/2015 | Ono | ........................ H04L 47/15 |
| 2003/0145100 A1 | * | 7/2003 | Marchetto | ............... H04L 47/22 |
| | | | | 709/233 |

FOREIGN PATENT DOCUMENTS

| CN | 1647463 B | 10/2010 |
| JP | 2007503740 A | 2/2007 |
| JP | 2008514059 A | 5/2008 |

(Continued)

OTHER PUBLICATIONS

International Search Report for PCT/KR2013/003082 dated Jun. 25, 2013.

(Continued)

*Primary Examiner* — Justin R Knapp
(74) *Attorney, Agent, or Firm* — Hauptman Ham, LLP

(57) ABSTRACT

A transmission device includes a data controller to output one or more data frames; a encoder to generate one or more encoded data packets for a first data frame among the one or more data frames; and a transmission controller to determine a transmission time point of each of the one or more encoded data packets, and transmit the one or more encoded data packets to a reception device at the determined transmission time point corresponding to each of the one or more encoded data packets.

15 Claims, 7 Drawing Sheets

(56) References Cited

FOREIGN PATENT DOCUMENTS

KR   1020100112168 A   10/2010
KR      101114129 B1    2/2012

OTHER PUBLICATIONS

Chinese Office Action dated Nov. 18, 2016 in connection with the counterpart Chinese Patent Application No. 201380023065.1.

* cited by examiner

DEVICE AND METHOD FOR TRANSMITTING/RECEIVING A PLURALITY OF ENCODED DATA PACKETS

CROSS-REFERENCE TO RELATED APPLICATION

The instant application is a continuation of PCT/KR2013/003082, filed on Apr. 12, 2013, which is based on and claims priority to Korean Patent Application No. 10-2012-0038022, filed on Apr. 12, 2012. The disclosures of above-listed applications are hereby incorporated by reference herein in their entirety.

TECHNICAL FIELD

The present disclosure relates to a transmission device, a reception device, and an operation method of the transmission device, for preventing a packet loss caused by transmitting a plurality of encoded data packets.

BACKGROUND ART

The statements in this section merely provide background information related to the present disclosure and do not constitute prior art.

Recently, a VoIP voice data frame is encoded using an Application Layer Forward Error Correction (AL-FEC) code and then transmitted to a reception side to compensate for loss during transmission.

For example, a transmission side generates and outputs the VoIP voice data in the unit of one frame per 20 ms and immediately transmitted to the reception side via a lower layer.

However, when encoding using AL-FEC codes are applied, after a certain quantity of VoIP voice data frames which are output in units of 20 ms are collected, the collected data frames are encoded and the encoded data (encoded data packets) are generated and output by a transmission side.

To explain in more detail with reference to FIG. 1, in case where encoding using AL-FEC codes are applied, when a voice codec of the transmission side generates and output voice data frames every 20 ms, the transmission side collects the predetermined number K (for example, 4) of voice data frames to be encoded, encodes the collected voice data frames, and then generates and outputs the particular number N (for example, 8) of encoded data packets which have been encoded. Then, the output encoded data packets are continuously transmitted to a reception side. The inventor(s) has experienced that this continuous transmission results in a concatenation loss of channels. The inventor(s) has noted that this is because there is a concern that the continuous loss will cause all the continuously transmitted encoded data packets to be lost.

SUMMARY

In accordance with an aspect of the present disclosure, a transmission device comprises a data controller, an encoder and a transmission controller. The data controller is configured to output one or more data frames. The encoder is configured to generate one or more encoded data packets for a first data frame among the one or more data frames. And the transmission controller is configured to determine a transmission time point of each of the one or more encoded data packets, and transmit the one or more encoded data packets to a reception device at the determined transmission time point corresponding to each of the one or more encoded data packets.

In accordance with another aspect of the present disclosure, a reception device comprises a communication unit and a controller. The communication unit is configured to receive one or more encoded data packets (i) encoded based on one or more data frames and (ii) transmitted at different transmission time points from a transmission device. And the controller is configured to identify order information including orders of encoding processing of the one or more encoded data packets and decode the one or more encoded data packets based on the identified order information, so as to obtain the one or more data frames.

In accordance with another aspect of the present disclosure, a transmission device is configured to output one or more data frames; generate one or more encoded data packets for a first data frame among the one or more data frames; determine a transmission time point of each of the one or more encoded data packets; and transmit each of the one or more encoded data packets to a reception device at the determined transmission time point corresponding to each of the one or more encoded data packets.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

The present disclosure relates to a transmission device, a reception device, and an operation method of the transmission device, which can effectively prevent a packet loss which is caused when a concatenation loss is generated in transmission of data frames by transmitting a plurality of encoded data packets in an optimally distributed manner when encoded data packets generated by encoding data frames to be transmitted are transmitted.

Hereinafter, embodiments of the present disclosure will be described with reference to the accompanying drawings.

Figure 2:
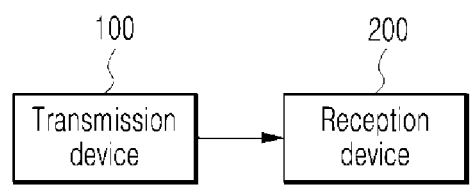
FIG. 2 is a block diagram of a system including a transmission device and a reception device according to at least one embodiment of the present disclosure.

FIG. 2 is a block diagram illustrating a system including a transmission device and a reception device according to at least one embodiment of the present disclosure.

As illustrated in FIG. 2, the system including the transmission device and the reception device includes a transmission device 100 configured to output one or more data frames to be transmitted, generate one or more encoded data packets based on the one or more data frames, and transmit the one or more encoded data packets to a reception device at different transmission time points via at least one wire or wireless (or, both wire and wireless) communication channel and a reception device 200 configured to receive one or more encoded data packets which have been encoded based on one or more data frames and transmitted from the transmission device 100 at different transmission time points via the at least one wire or wireless (or, both wire and wireless) communication channel, identify order information related to an order of the encoding of the received one or more encoded data packets, and decode the one or more encoded data packets based on the identified order information, so as to obtain one or more data frames. The transmission device 100 and the reception device 200 comprise one or more processors and/or application-specific integrated circuits (ASICs), respectively.

The transmission device 100 adopts an encoding processing method using a particular code to compensate for a loss generated while data is transmitted to the reception device 200.

Then, the transmission device 100 generates and outputs one or more data frames to be transmitted at particular time intervals, processes encoding to generate one or more encoded data packets based on the output one or more data frames, and transmits the one or more encoded data packets to the reception device 200.

At this time, in transmitting the one or more encoded data packets to the reception device 200, the transmission device 100 transmits the encoded data packets in a distributed manner by transmitting the one or more encoded data packets to the reception device 200 at different transmission time points.

Here, the encoding processing method adopted by the transmission device 100 is an encoding processing method using an Application Layer Forward Error Correction (AL-FEC) code.

Further, the transmission device 100 includes a transmission device transmitting VoIP voice data.

Figure 3:
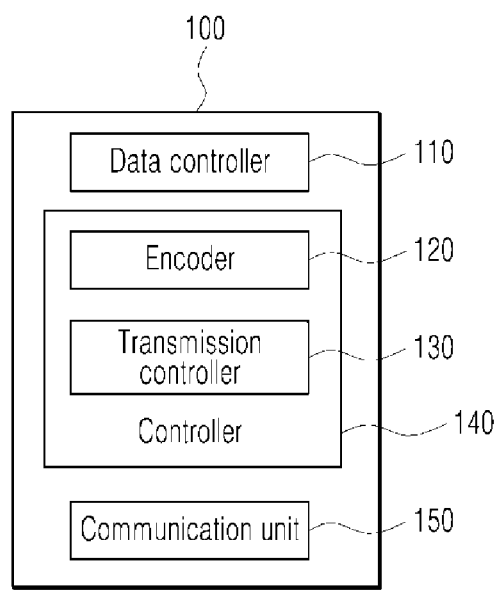
FIG. 3 is a block diagram of a transmission device according to at least one embodiment of the present disclosure.

Hereinafter the transmission device according to at least one embodiment of the present disclosure will be described in more detail with reference to FIG. 3.

The transmission device 100 includes a data controller 110 configured to output one or more data frames, a controller 140 configured to generate one or more encoded data packets based on the one or more data frames output by the data controller 110 and transmit the one or more encoded data packets to the reception device at different transmission time points via a communication unit 150, and the communication unit 150 configured to transmit the one or more encoded data packets. Other components of the transmission device 100, such as the data controller 110, the controller 140 and the communication unit 150 comprise one or more processors and/or application-specific integrated circuits (ASICs).

The data controller 110 generates one or more data frames to be transmitted at particular time intervals and outputs the generated data frames to the controller 140.

For example, the data controller 110 includes a voice codec (not shown) for generating one or more data frames to be transmitted at 20 ms intervals and sequentially outputting the generated data frames to the controller 140 in accordance with the VoIP voice data to be transmitted.

The controller 140 processes encoding to generate one or more encoded data packets based on one or more data frames output by the data controller 110 and transmits the one or more encoded data packets to the reception device 200.

At this time, in transmitting the one or more encoded data packets to the reception device 200, the controller 140 transmits the encoded data packets in a distributed manner by transmitting the one or more encoded data packets to the reception device 200 at different transmission time points.

Alternatively or additionally, the controller 140 includes an encoder 120 and a transmission controller 130, independently. Other components of the controller 140, such as the encoder 120 and the transmission controller 130 comprise one or more processors and/or application-specific integrated circuits (ASICs).

The encoder 120 generates one or more encoded data packets based on one or more data frames output by the data controller 110.

More specifically, with respect to each of the one or more data frames sequentially output by the data controller 110, the encoder 120 generates the encoded data packet at a time point when the data controller 110 outputs the data frame.

At this time, among the encoded data packets generated by the encoder 120 with respect to the one or more data frames, an encoded data packet generated with respect to a particular data frame is a first encoded data packet based on only the particular data frame or the first encoded data packet and a second encoded data packet based on the particular data frame and one or more data frames output earlier than the particular data frame by the data controller 110.

Here, the particular data frame refers to each of the one or more data frames.

Further, the first encoded data packet is defined as an encoded data packet among the plurality of encoded data packets generated based on and from one data frame.

In addition, the second encoded data packet is defined as an encoded data packet among the plurality of encoded data packets generated based on two or more data frames.

For example, more specifically, the encoder 120 generates one or more encoded data packets based on and from each of the one or more data frames by using a preset encoding matrix.

Here, the encoder 120 adopts an encoding processing method using an Application Layer Forward Error Correction (AL-FEC) code such as a parity-check code or an LT code implemented based on an exclusive-or operation.

More specifically, the encoder 120 sequentially receives data frames output by the data controller 110 at 20 ms intervals, generates one or more encoded data packets by applying each of the received one or more data frames to the preset encoding matrix according to the adopted encoding processing method, and transmits the generated one or more encoded data packets to the transmission controller 130.

For example, the encoding processing method adopted by the encoder 120 sets the number (K) of data frames to be encoded as 4 and the number (N) of encoded data packets output through the encoding as 8, and presets an encoding matrix (G) as the following structure according to the above setting. Here, each row of the encoding matrix (G) refers to a number of the encoded data packet having passed through the encoding processing and each column of the encoding matrix (G) refers to a number of the data frame to be encoded.

$$G = \begin{bmatrix} 1 & 0 & 0 & 0 \\ 0 & 1 & 0 & 0 \\ 0 & 0 & 1 & 0 \\ 0 & 0 & 0 & 1 \\ 1 & 1 & 0 & 0 \\ 1 & 0 & 1 & 0 \\ 1 & 0 & 0 & 1 \\ 0 & 1 & 1 & 1 \end{bmatrix}$$

Further, the encoding processing method adopted by the encoder 120 is simply expressed by G·$\underline{m}$=$\underline{c}$. Here, m and c denote vector quantities, m corresponds to lists of data frames (for example, VoIP voice data frames) before the encoding processing, a vector length is K, that is, the number (K) of data frames to be encoded, and each element is a data value of the data frame. The encoding matrix (G) refers to a parity check code generation matrix and c refers to a finally encoded encoded data packet.

Figure 5:
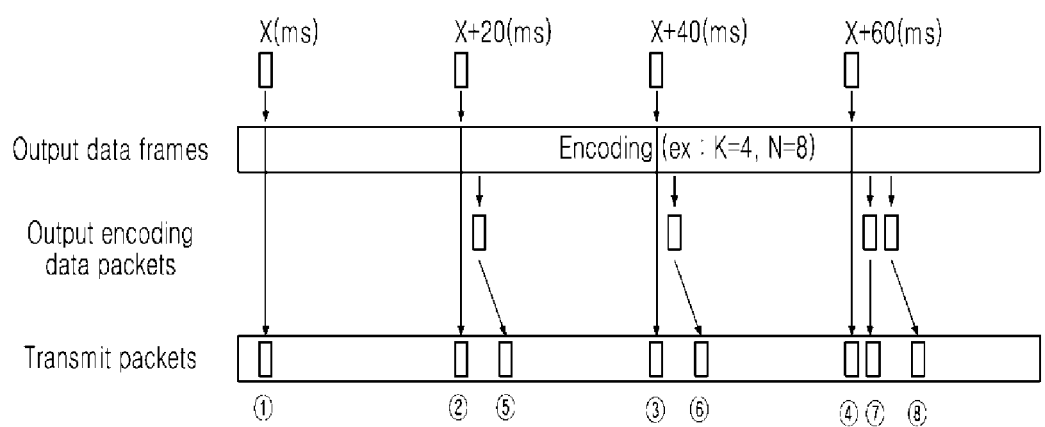
FIG. 5 is an example of a method in which a transmission device transmits encoded data packets according to at least one embodiment of the present disclosure.

For example, the encoder 120 sequentially receives four data frames (it is assumed that the four data frames are denoted as a first data frame thru a forth data frame for convenience of disclosure explanation) output by the data controller 110 at 20 ms intervals as illustrated in FIG. 5.

When the encoder 120 receives a first data frame firstly output by the data controller 110, the encoder 120 applies the first data frame to the encoding matrix (G) and generate a first encoded data packet.

That is, with respect to the first data frame sequentially output by the data controller 110, the encoder 120 immediately generates the first encoded data packet at a time point when the data controller 110 outputs the first data frame. In this case, the first encoded data packet is a first encoded data packet based on only the first data frame.

Further, when the encoder 120 receives the data frame secondly output by the data controller 110 after 20 ms, the encoder 120 applies the output data frame to the encoding matrix (G) and generate a second encoded data packet and a fifth encoded data packet.

That is, with respect to the second data frame sequentially output by the data controller 110, the encoder 120 immediately generates the second encoded data packet and the fifth encoded data packet at a time point when the data controller 110 outputs the second data frame. In this case, the second encoded data packet is a first encoded data packet based on only the second data frame. Further, the fifth encoded data packet is a second encoded data packet based on the second data frame and the first data frame output earlier than the second data frame by the data controller 110.

In addition, when the encoder 120 receives the data frame thirdly output by the data controller 110, the encoder 120 applies the output data frame to the encoding matrix (G) and generate a third encoded data packet and a sixth encoded data packet.

That is, with respect to the third data frame sequentially output by the data controller 110, the encoder 120 immediately generates the third encoded data packet and the sixth encoded data packet at a time point when the data controller 110 outputs the third data frame. In this case, the third encoded data packet is a first encoded data packet based on only the third data frame. Further, the sixth encoded data packet is a second encoded data packet based on the third data frame and the first data frame output earlier than the third data frame by the data controller 110.

In addition, when the encoder 120 receives the data frame fourthly output by the data controller 110 after 20 ms, the encoder 120 applies the output data frame to the encoding matrix (G) and generate a fourth encoded data packet, a seventh encoded data packet, and an eighth encoded data packet.

That is, with respect to the fourth data frame sequentially output by the data controller 110, the encoder 120 immediately generates the fourth encoded data packet, the seventh encoded data packet, and the eighth encoded data packet at a time point when the data controller 110 outputs the fourth data frame. In this case, the fourth encoded data packet is a first encoded data packet based on only the fourth data frame. Further, the seventh encoded data packet is a second encoded data packet based on the fourth data frame and the first data frame output earlier than the fourth data frame by the data controller 110. In addition, the eighth encoded data packet is a second encoded data packet based on the fourth data frame, and the second data frame and the third data frame output earlier than the fourth data frame by the data controller 110.

The transmission controller 130 determines a transmission time point of each of the one or more encoded data packets generated by the encoder 120 and transmits each of the one or more encoded data packets to the reception device 200 through the communication unit 150 at a transmission time point corresponding to each of the one or more encoded data packets.

In at least one embodiment, the transmission controller 130 determines the transmission time point of the encoded data packet generated with respect to each of the one or more data frames as a generation time point by the encoder 120.

The following description will be made based on the aforementioned case where the encoder 120 generates the first encoded data packet, the second and fifth encoded data packets, the third and sixth encoded data packets, and the fourth, seventh, and eighth encoded data packets with respect to the first data frame, the second data frame, the third data frame, and the fourth data frame sequentially output by the data controller 110 at 20 ms intervals.

The transmission controller 130 determines a transmission time point of the first encoded data packet generated with respect to the firstly output data frame as a generation time point when the encoder 120 generates the first encoded data packet. Accordingly, when the transmission controller 130 receives the first encoded data packet generated by the encoder 120, the transmission controller 130 immediately transmits the first encoded data packet to the reception device 200.

The transmission controller 130 determines a transmission time point of the second encoded data packet and the fifth encoded data packet generated with respect to the secondly output data frame as a generation time point when the encoder 120 generates the second encoded data packet and the fifth encoded data packet. Accordingly, when the transmission controller 130 receives the second encoded data packet and the fifth encoded data packet generated by the encoder 120, the transmission controller 130 immediately transmits the second encoded data packet and the fifth encoded data packet to the reception device 200.

The transmission controller 130 determines a transmission time point of the third encoded data packet and the sixth encoded data packet generated with respect to the thirdly output data frame as a generation time point when the encoder 120 generates the third encoded data packet and the sixth encoded data packet. Accordingly, when the transmission controller 130 receives the third encoded data packet and the sixth encoded data packet generated by the encoder 120, the transmission controller 130 immediately transmits the third encoded data packet and the sixth encoded data packet to the reception device 200.

The transmission controller 130 determines a transmission time point of the fourth encoded data packet, the seventh encoded data packet, and the eighth encoded data packet generated with respect to the fourthly output data frame as a generation time point when the encoder 120 generates the fourth encoded data packet, the seventh encoded data packet, and the eighth encoded data packet. Accordingly, when the transmission controller 130 receives the fourth encoded data packet, the seventh encoded data packet, and the eighth encoded data packet generated by the encoder 120, the transmission controller 130 immediately transmits the fourth encoded data packet, the seventh encoded data packet, and the eighth encoded data packet to the reception device 200.

In at least another embodiment, among the encoded data packets generated by the encoder 120 with respect to the one or more data frames, the transmission controller 130 identifies the first encoded data packet generated based on one data frame and determine a transmission time point of the first encoded data packet as a generation time point when the encoder 120 generates the first encoded data packet.

Among the encoded data packets generated by the encoder 120 with respect to the one or more data frames, the transmission controller 130 identifies the second encoded data packet generated based on two or more data frames and determine a transmission time point of the second encoded data packet as a time point after a particular delay time from a generation time point when the encoder 120 generates the second encoded data packet.

For example, more specifically, among the encoded data packets generated by the encoder 120 with respect to the one or more data frames based on the encoding matrix, the transmission controller 130 identifies the first encoded data packet and the second encoded data packet.

That is, based on the encoding matrix (G) used for the encoding processing by the encoder 120, the transmission controller 130 identifies the first encoded data packet generated based on only one data frame among the encoded data packets generated with respect to the one or more data frames. Here, the first encoded data packet corresponds to a systematic part by the encoding matrix (G).

Then, when the transmission controller 130 identifies the first encoded data packet generated based on only one data frame according to the encoding matrix (G), the transmission controller 130 determines a transmission time point of the identified first encoded data packet as a generation time point when the encoder 120 generates the first encoded data packet and thus transmits the first encoded data packet to the reception device 200 immediately when the encoder 120 generates the first encoded data packet/the transmission controller 130 receives the first encoded data packet from the encoder 120.

Meanwhile, based on the encoding matrix (G) used for the encoding processing by the encoder 120, the transmission controller 130 identifies the second encoded data packet generated based on two or more data frames among the encoded data packets generated with respect to the one or more data frames. Here, the second encoded data packet corresponds to a non-systematic part by the encoding matrix (G).

Then, when the transmission controller 130 identifies the second encoded data packet generated based on two or more data frames according to the encoding matrix (G), the transmission controller 130 determines a transmission time point of the identified second encoded data packet as a time point after a particular delay time (T) from a generation time point when the encoder 120 generates the second encoded data packet and thus transmits the second encoded data packet to the reception device 200 after the delay time (T) when the encoder 120 generates the second encoded data packet/the transmission controller 130 receives the second encoded data packet from the encoder 120.

Referring to FIG. 5, since the transmission controller 130 identifies the first encoded data packet generated with respect to the firstly output data frame based on the encoding matrix (G) as the first encoded data packet generated based on only one data frame, the transmission controller 130 determines the transmission time point of the first encoded data packet as the generation time point and thus transmits the first encoded data packet to the reception device 200 immediately when the encoder generates the first encoded data packet and the transmission controller 130 receives the generated first encoded data packet.

Further, since the transmission controller 130 identifies the first encoded data packet generated with respect to the secondly output data frame based on the encoding matrix (G) as the first encoded data packet generated based on only one data frame, the transmission controller 130 determines the transmission time point of the second encoded data packet as the generation time point and thus transmits the second encoded data packet to the reception device 200 immediately when the encoder 120 generates the second encoded data packet and the transmission controller 130 receives the generated second encoded data packet.

Meanwhile, since the transmission controller 130 identifies the fifth encoded data packet generated with respect to the secondly output data frame based on the encoding matrix (G) as the second encoded data packet generated based on two or more data frames, the transmission controller 130 determines the transmission time point of the fifth encoded data packet as a time point after a particular delay time (T) from the generation time point and thus transmits the fifth encoded data packet to the reception device 200 after the delay time (T) when the encoder 120 generates the fifth encoded data packet and the transmission controller 130 receives the generated fifth encoded data packet.

Further, since the transmission controller 130 identifies the third encoded data packet generated with respect to the thirdly output data frame as the first encoded data packet generated based on only one data frame based on the encoding matrix (G), the transmission controller 130 determines the transmission time point of the third encoded data packet as the generation time point and thus transmits the third encoded data packet to the reception device 200 immediately when the encoder 120 generates the third encoded data packet and the transmission controller 130 receives the generated third encoded data packet.

Meanwhile, since the transmission controller 130 identifies the sixth encoded data packet generated with respect to the thirdly output data frame as the second encoded data packet generated based on two or more data frames based on the encoding matrix (G), the transmission controller 130 determines the transmission time point of the sixth encoded data packet as a time point after a particular delay time (T) from the generation time point and thus transmits the sixth encoded data packet to the reception device 200 after the delay time (T) when the encoder 120 generates the sixth encoded data packet and the transmission controller 130 receives the generated sixth encoded data packet.

Further, since the transmission controller 130 identifies the fourth encoded data packet generated with respect to the fourthly output data frame as the first encoded data packet generated based on only one data frame based on the encoding matrix (G), the transmission controller 130 determines the transmission time point of the fourth encoded data packet as the generation time point and thus transmits the fourth encoded data packet to the reception device 200 immediately when the encoder 120 generates the fourth encoded data packet and the transmission controller 130 receives the generated fourth encoded data packet.

Meanwhile, since the transmission controller 130 identifies the seventh encoded data packet and the eighth encoded data packet generated with respect to the fourthly output data frame as the second encoded data packet generated based on two or more data frames based on the encoding matrix (G), the transmission controller 130 determines the transmission time point of the seventh encoded data packet and the eighth encoded data packet as a time point after a particular delay time (T) from the generation time point and thus transmits the seventh encoded data packet and the eighth encoded data packet to the reception device 200 after the delay time (T) when the encoder 120 generates the seventh encoded data packet and the eighth encoded data packet and the transmission controller 130 receives the generated seventh encoded data packet and eighth encoded data packet.

Here, the particular delay time (T) is configured by an operator of the transmission device 100 or is changed (or configured) in accordance with the encoding processing method adopted by the transmission device 100. Alternatively, the particular delay time (T) is configured in each of the encoded data packets equally or differently according to a characteristic of each of the encoded data packets.

At this time, when the determined transmission time point of the second encoded data packet is later than an preset limit time point after a particular preset delay time from an output time point of the data frame firstly output by the data controller 110 from among the two or more data frames as described above, the transmission controller 130 re-determines the transmission time point of the second encoded data packet as the generation time point of the second encoded data packet.

In other words, when the transmission time point of the second encoded data packet generated based on the two or more data frames is determined as described above, the transmission controller 130 identifies whether the determined transmission time point is determined as the time point later than the preset limit time point after the particular preset delay time from the output time point of the data frame firstly output by the data controller 110 from among the two or more data frames.

Then, when the determined transmission time point of the second encoded data packet is later than the preset limit time point, the transmission controller 130 re-determines the transmission time point of the corresponding second encoded data packet as the generation time point when the encoder 120 generates the second encoded data packet and thus transmits the second encoded data packet to the reception device 200 immediately when the encoder 120 generates the second encoded data packet/the transmission controller 130 receives the second encoded data packet.

A case where the transmission time point of the seventh encoded data packet is determined as a time point later than the preset limit time point will be described as an example with reference to FIG. 5.

In this case, since the seventh encoded data packet is identified as the second encoded data packet generated based on the two or more data frames, that is, the first and fourth data frames according to the encoding matrix (G), the transmission controller 130 determines the transmission time point as a time point after a particular delay time (T) from the generation time point.

However, the transmission controller 130 determines the determined transmission time point of the seventh encoded data packet as a time point later than the preset limit time point after a particular preset delay time from an output time when the data controller 110 outputs the first data frame and re-determines the generation time point when the encoder 120 generates the seventh encoded data packet as the transmission time point, so as to transmit the seventh encoded data packet to the reception device 200 immediately when the encoder 120 generates the seventh encoded data packet and the transmission controller 130 receives the generated seventh encoded data packet.

Here, the encoder 120 or the transmission controller 130 inserts order information (the numbers of the encoded data packets) related to orders of the encoding processing of the encoded data packets.

Figure 1:
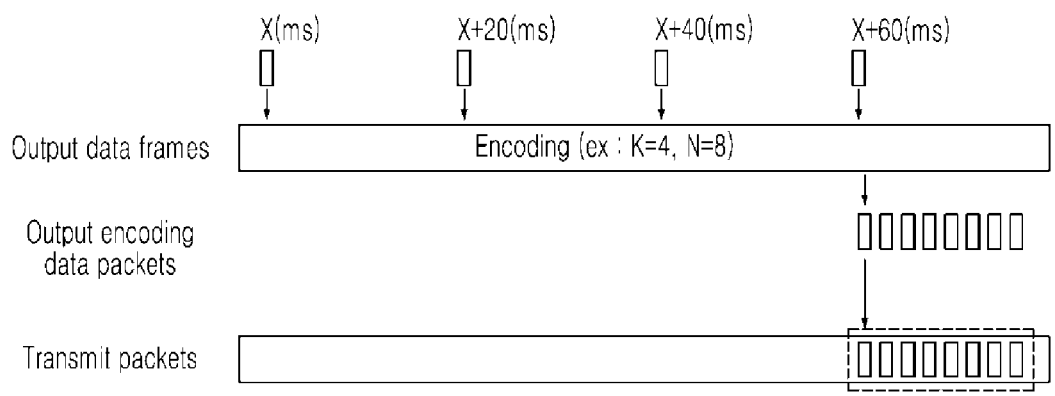
FIG. 1 is an example of a known method of transmitting encoded data packets.

Referring back to FIG. 1, the reception device 200 receives one or more encoded data packets which have been encoded based on one or more data frames and transmitted by the transmission device 100 at different transmission time points.

Further, the reception device 200 identifies the order information related to orders of the encoding processing of the received one or more encoded data packets are encoded and decode the one or more encoded data packets based on the identified order information, so as to decode and obtain the one or more data frames.

To this end, the reception device 200 will adopt a decoding processing method corresponding to the encoding processing method adopted by the transmission device 100.

The reception device 200 includes a reception device receiving VoIP voice data.

Figure 4:
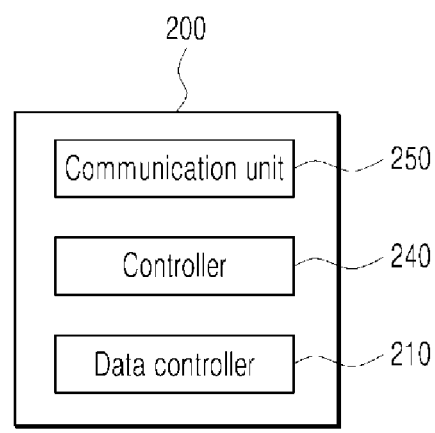
FIG. 4 is a block diagram of a reception device according to at least one embodiment of the present disclosure.

Hereinafter the reception device according to at least one embodiment of the present disclosure will be described in more detail with reference to FIG. 4.

The reception device 200 includes a communication unit 250 configured to receive one or more encoded data packets encoded based on one or more data frames and transmitted by the transmission device 100 and a controller 240 configured to identify order information related to orders of the encoding processing of the one or more encoded data packets and encode the one or more encoded data packets based on the identified order information, so as to obtain the one or more data frames. The reception device 200 further includes a data controller 210. Other components of the reception device 200, such as the communication unit 250, the controller 240 and the data controller 210 comprise one or more processors and/or application-specific integrated circuits (ASICs).

The communication unit 250 receives one or more encoded data packets encoded based on one or more data frames and distributed (or transmitted) at different transmission time points by the transmission device 100 according to the at least one embodiment of the present disclosure described above.

The controller 240 identifies the order information related to the orders of the encoding processing of the one or more encoded data packets received through the communication unit 250 are encoded and decodes the one or more encoded data packets based on the identified order information, so as to obtain the one or more data frames.

In other words, in transmitting the encoded data packets at different transmission time points as illustrated in FIG. 5, the transmission device 100 inserts the order information (the numbers of the encoded data packets) related to the orders of the encoding processing of the encoded data packets as described above.

Then, the controller 240 of the reception device 200 identifies the order information related to the orders of the encoding processing of one or more encoded data packets received through the communication unit 250.

Further, the controller 240 decodes the one or more encoded data packets based on the identified order information to obtain the one or more data frames.

In other words, the controller 240 will adopt a decoding processing method corresponding to the encoding processing method adopted by the transmission device 100 or a decoding processing method called Belief Propagation (BP).

Then, the controller 240 arranges the one or more encoded data packets based on the identified order information and decodes the arranged one or more data packets according to the pre-adopted decoding processing method, so as to decode and obtain one or more data frames which the transmission device 100 desires to transmit.

Further, the controller 240 outputs (transmits) the decoded and obtained data frames to the data controller 210 of the reception device 200 to allow the transmission device 100 to use the transmitted data frames.

As described above, according to the transmission device and the reception device, when a plurality of encoded data packets are generated and transmitted based on data frames which the transmission device transmits to the reception device, a transmission time point of each of the plurality of encoded data packets is determined and the encoded data packets are transmitted at different transmission time points, so that the plurality of encoded data packets can be transmitted in an optimally distributed manner and accordingly, the loss of a large amount of packets which is caused when a concatenation loss is generated can be effectively prevented.

Figure 6:
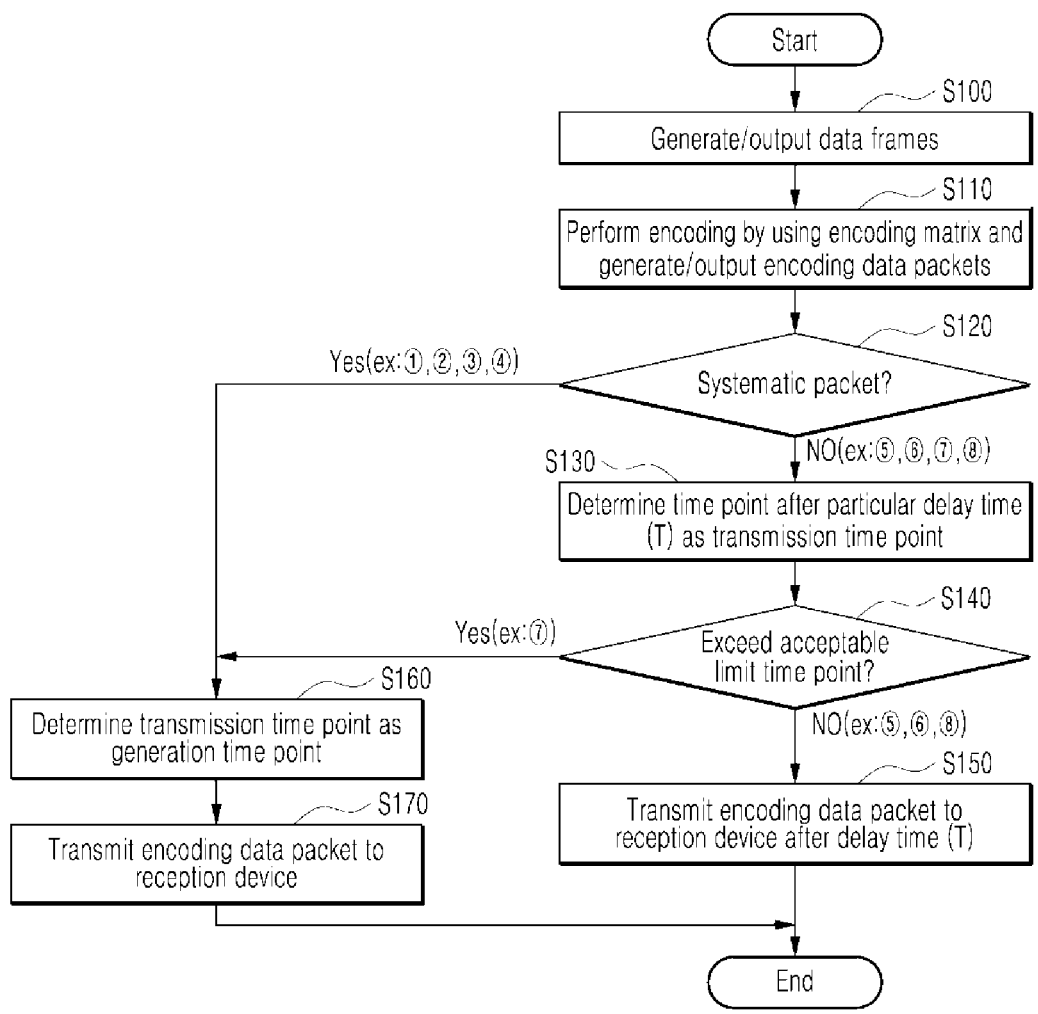
FIG. 6 is a flowchart of an operation method of a transmission device according to at least one embodiment of the present disclosure.
Figure 7:
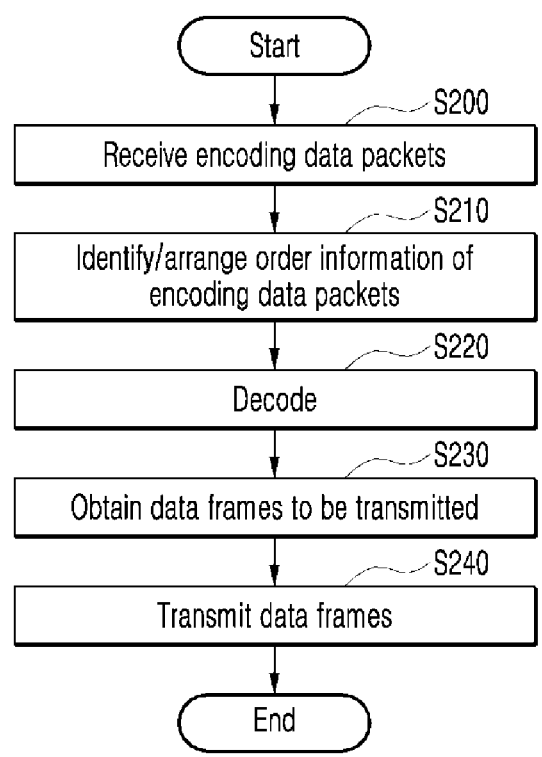
FIG. 7 is a flowchart of an operation method of a reception device according to at least one embodiment of the present disclosure.

Hereinafter operation methods of the transmission device and the reception device according to at least one embodiment of the present disclosure will be described with reference to FIGS. 6 and 7. For the convenience of descriptions, the reference numerals used in FIGS. 2 to 5 will be used equally.

First, an operation method of the transmission device 100 according to at least one embodiment of the present disclosure will be described with reference to FIG. 6.

The operation method of the transmission device 100 generates one or more data frames to be transmitted at particular time intervals and outputs the generated one or more data frames to perform encoding processing in step S100.

The operation method of the transmission device 100 generates one or more encoded data packets based on each of the one or more data frames output in step S100 by using a preset encoding matrix in step S110.

That is, for example, the operation method of the transmission device 100 receives data frames output at 20 ms intervals in step S100 and generates and outputs corresponding one or more encoded data packets by applying each of the received one or more data frames to the preset encoding matrix according to an adopted encoding processing method.

As illustrated in FIG. 5, the operation method of the transmission device 100 receives four data frames output at 20 ms intervals. The method applies, when receiving a firstly output data frame at X(ms), the firstly output data frame to an encoding matrix (G) and generates a first encoded data packet for the firstly output data frame at X(ms), applies, when receiving a secondly output data frame after 20 ms, i.e., at X+20 (ms), the secondly output data frame to the encoding matrix (G) and generates a second encoded data packet and a fifth encoded data packet, applies, when receiving a thirdly output data frame after another 40 ms, i.e., at X+40 (ms), the thirdly output data frame to the encoding matrix (G) and generates a third encoded data packet and a sixth encoded data packet, and applies, when receiving a fourthly output data frame after 60 ms, i.e., at X+20 (ms), the fourthly output data frame to the encoding matrix (G) and generates a fourth encoded data packet, a seventh encoded data packet, and an eighth encoded data packet.

Further, the operation method of the transmission device 100 identifies the first encoded data packet generated using only one data frame through the encoding matrix (G) used in the encoding processing as a systematic part by the encoding matrix (G).

The operation method of the transmission device 100 identifies whether the encoded data packet generated and output in step S110 is the first encoded data packet generated using only one data frame (i.e., the firstly out data frame at X(ms)) through the encoding matrix (G) in step S120.

Referring to FIG. 5, when the encoded data packet (for example, the first, second, third, or fourth encoded data packet) is identified as a corresponding encoded data packet firstly generated using each of data frames through the encoding matrix (G), the transmission device 100 determines a transmission time of the identified corresponding encoded data packet (for example, the first, second, third, or fourth encoded data packet) for each of the data frames as a generation time point when the identified corresponding encoded data packet (for example, the first, second, third, or fourth encoded data packet) for each of the data frames is generated in step S110 in step S160. As a result, the identified corresponding encoded data packet (for example, the first, second, third, or fourth encoded data packet) is transmitted to the reception device 200 immediately without a time delay when the corresponding encoded data packet is firstly generated and received in step S110 in step S170.

Meanwhile, the transmission device 100 identifies the second encoded data packet generated using two or more data frames through the encoding matrix (G) used in the encoding processing as a systematic part by the encoding matrix (G).

When the encoded data packet (for example, the fifth, sixth, seventh, or eighth encoded data packet) is identified as another encoded data packet generated from the firstly output data frame at X(ms), the transmission device 100 determines a transmission time of the identified another encoded data packet (for example, the fifth, sixth, seventh, or eighth encoded data packet) as a transmission time point after a particular delay time (T) from a generation time point when the identified another encoded data packet (for example, the fifth, sixth, seventh, or eighth encoded data packet) is generated in S110 in step S130.

At this time, when the transmission time point of the another encoded data packet (for example, the fifth, sixth, seventh, or eighth encoded data packet) is determined as described above, the transmission device 100 identifies whether the determined transmission time point is determined as a time point later than an preset limit time point after a particular preset delay time in step S140.

Referring to FIG. 5, since the sixth encoded data packet is identified as the another encoded data packet generated using two or more data frames, that is, the first data frame and third data frame (i.e., a data frame firstly output at X(ms) and a data frame thirdly output at X+40 (ms)) through the encoding matrix (G), the transmission device 100 determines a transmission time point after a particular delay time (T) distributed from a generation time point as the transmission time point in step S130. Since the transmission time point of the sixth encoded data packet is not later than the preset limit time point after the particular preset time from an output time point when the first data frame is output in step S100, the sixth encoded data packet is transmitted to the reception device 200 after the delay time (T) when the sixth encoded data packet is generated and received in step S120 in step S150.

Here, the particular delay time (T) is configured by an operator of the transmission device 100 or is changed (or configured) in accordance with the encoding processing method adopted by the transmission device 100. Alternatively, the particular delay time (T) is configured in each of the encoded data packets equally or differently according to a characteristic of each of the encoded data packets.

Meanwhile, a case where the transmission time point of the seventh encoded data packet is determined as a transmission time point later than the preset limit time point will be described as an example with reference to FIG. 5.

In this case, since the seventh encoded data packet is identified as another encoded data packet generated based on the two or more data frames, that is, the first data frame and fourth data frame (i.e., a data frame firstly output at X(ms) and a data frame fourthly output at X+40 (ms)) through the encoding matrix (G), the operation method of the transmission device 100 determines a time point after the particular delay time (T) from the generation time point as the transmission time point. However, since the determined transmission time point of the seventh encoded data packet is a time point later than the preset limit time point after the particular preset delay time from the output time point when the first data frame is output in step S200, the transmission device 100 proceeds to step S160 to re-determine the transmission time point of the seventh encoded data packet as the generation time point when the seventh encoded data packet is generated in step S110 and thus transmits the seventh encoded data packet to the reception device 200 immediately without a time delay when the seventh encoded data packet is generated and received in step S170.

Here, the transmission device 100 inserts order information (the numbers of the encoded data packets) related to orders of the encoding processing of the encoded data packets.

Hereinafter an operation method of the reception device according to at least one embodiment of the present disclosure will be described with reference to FIG. 7.

The operation method of the reception device 200 receives one or more encoded data packets encoded based on one or more data frames and distributed (or transmitted) by the transmission device 100 at different transmission time points in step S200.

The operation method of the reception device 200 a identifies the order information related to the orders of the encoding processing of the received one or more encoded data packets and decodes the one or more encoded data packets based on the identified order information, so as to obtain the one or more data frames.

In other words, in transmitting the encoded data packets at different transmission time points as illustrated in FIG. 5, the transmission device 100 inserts the order information (the numbers of the encoded data packets) related to the orders of the encoding processing of the encoded data packets as described above.

Further, the operation method of the reception device 200 adopts a decoding processing method corresponding to the encoding processing method adopted by the transmission device 100 or a decoding processing method called Belief Propagation (BP).

The operation method of the reception device 200 identifies the order information related to the orders of the encoding processing of the received one or more encoded data packets and arrange the one or more encoded data packets based on the identified order information in step S210.

Further, the operation method of the reception device 200 decodes the arranged one or more encoded data packets according to a pre-adopted decoding processing method in step S220 and decode and obtain one or more data frames which the transmission device 100 desires to transmit.

In addition, the operation method of the reception device 200 outputs (or transmits) the decoded and obtained data frames to the data controller 210 of the reception device 200 to allow the transmission device 100 to use the transmitted data frames.

As described above, according to the transmission device and the reception device according to the at least one embodiment of the present disclosure, when a plurality of encoded data packets are generated and transmitted based on data frames which the transmission device transmits to the reception device, a transmission time point of each of the plurality of encoded data packets is determined and the encoded data packets are transmitted at different transmission time points, so that the plurality of encoded data packets can be transmitted in an optimally distributed manner and accordingly, the loss of a large amount of packets which is caused when a concatenation loss is generated can be prevented.

The transmission device and the reception device are implemented in a form of program commands executed through various computer means to be recorded in a non-transitory computer readable medium. The non-transitory computer readable medium includes a program command, a data file, a data structure, and the like independently or in combination. The program command recorded in the non-transitory computer readable medium is things specially designed and configured for the present disclosure, or things that are well known to and can be used by those skilled in the computer software related art. Examples of the non-transitory computer readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware devices are configured to operate as one or more software modules and/or microprocessors to perform the operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure. Therefore, the subject matter of the present disclosure should be identified only by the following appended claims, and all equivalents or equivalent modifications thereof should be construed as falling within the scope of the claimed invention. Specific terms used in this disclosure and drawings are used for illustrative purposes and not to be considered as limitations of the present disclosure.

What is claimed is:

1. A transmission device, comprising:
   a data controller configured to output a plurality of data frames;
   an encoder configured to generate a first plurality of encoded data packets and a second plurality of encoded data packets for the plurality of data frames by applying each data frame of the plurality of data frames to a preset encoding matrix; and
   a transmission controller configured to
      determine transmission time points of each encoded data packet of the first plurality of encoded data packets and second plurality of encoded data packets, and
      transmit the first plurality of encoded data packets and second plurality of encoded data packets to a reception device at the determined transmission time points,
   wherein
      each encoded data packet of the first plurality of encoded data packets is generated based on each corresponding data frame among the plurality of data frames, and
      each encoded data packet of the second plurality of encoded data packets is generated based on at least two data frames among the plurality of data frames, and
   wherein the transmission controller is configured to determine
      each transmission time point of each encoded data packet of the first plurality of encoded data packets as a first time point when the encoder generates the each encoded data packet of the first plurality of encoded data packets and
      each transmission time point of each encoded data packet of the second plurality of encoded data packets as a second time point after a preset delay time from when the encoder generates the each encoded data packet of the second plurality of encoded data packets.

2. The transmission device of claim 1, wherein the encoder is configured to generate, based on a first data frame among the plurality of data frames, a first encoded data packet among the first plurality of encoded data packets at a third time point when the data controller outputs the first data frame.

3. The transmission device of claim 2, wherein the encoder is configured to generate a second encoded data packet, among the first plurality of encoded data packets, based on a second data frame among the plurality of data frames at a fourth time point when the data controller outputs the second data frame among the plurality of data frames.

4. The transmission device of claim 3, wherein the encoder is configured to generate a third encoded data packet among the second plurality of encoded data packets, based on the first data frame and the second data frame, at the fourth time point when the data controller outputs the second data frame.

5. The transmission device of claim 4, wherein the transmission controller is configured to
   determine a transmission time point of the third encoded data packet as a fifth time point after a preset delay time from the fourth time point when the encoder generates the third encoded data packet.

6. The transmission device of claim 5, wherein, when the determined transmission time point of the third encoded data packet is later than a preset limit time point, the transmission controller is configured to determine the transmission time point of the third encoded data packet as the fourth time point when the third encoded data packet is generated.

7. The transmission device of claim 1, wherein the transmission controller is configured to insert order information into the first and second plurality of encoded data packets, the order information including orders of the first and second plurality of encoded data packets.

8. The transmission device of claim 1, wherein the encoder is configured to insert order information into the first and second plurality of encoded data packets, the order information including orders of the first and second plurality of encoded data packets.

9. A system, comprising:
   a transmission device; and
   a reception device configured to
      receive a plurality of encoded data packets (i) encoded based on a plurality of data frames and (ii) transmitted at different transmission time points from the transmission device,
      identify order information including orders the plurality of encoded data packets, and
      decode the plurality of encoded data packets based on the identified order information, so as to obtain the plurality of data frames,
   wherein the transmission device is configured to
      generate a first plurality of encoded data packets based on each corresponding data frame among the plurality of data frames and a second plurality of encoded data packets based on at least two data frames among the plurality of data frames, by applying each data frame of the plurality of data frames to a preset encoding matrix, and
      determine each transmission time point of each encoded data packet of the first plurality of encoded data packets as a time point when the each encoded data packet of the first plurality of encoded data packets is generated and each transmission time point of each encoded data packet of the second plurality of encoded data packets as a second time point after a preset delay time from when the each encoded data packet of the second plurality of encoded data packets is generated.

10. An operation method performed by a transmission device, the operation method comprising:
   outputting a plurality of data frames;
   generating a first plurality of encoded data packets and a second plurality of encoded data packets for the plurality of data frames by applying each data frame of the plurality of data frames to a preset encoding matrix;

determining transmission time points of each encoded data packet of the first plurality of encoded data packets and second plurality of encoded data packets; and transmitting the first plurality of encoded data packets and second plurality of encoded data packets to a reception device at the determined transmission time points, wherein
- each encoded data packet of the first plurality of encoded data packets is generated based on each corresponding data frame among the plurality of data frames, and
- each encoded data packet of the second plurality of encoded data packets is generated based on at least two data frames among the plurality of data frames, and wherein
- each transmission time point of each encoded data packet of the first plurality of encoded data packets is determined as a first time point when the each encoded data packet of the first plurality of encoded data packets is generated, and
- each transmission time point of each encoded data packet of the second plurality of encoded data packets is determined as a second time point after a preset delay time from when the each encoded data packet of the second plurality of encoded data packets is generated.

11. The operation method of claim 10, wherein a first encoded data packet among the first plurality of encoded data packets is generated based on a first data frame among the plurality of data frames at a third time point when the first data frame is output.

12. The operation method of claim 11, wherein a second encoded data packet among the first plurality of encoded data packets is generated based on a second data frame among the plurality of data frames at a fourth time point when the second data frame is output.

13. The operation method of claim 12, wherein a third encoded data packet among the second plurality of encoded data packets is generated based on based on the first data frame and the second data frame at the fourth time point when the second data frame is output.

14. The operation method of claim 13 wherein a transmission time point of the third encoded data packet is determined as a fifth time point after a preset delay time from the fourth time point when the third encoded data packet is generated.

15. The operation method of claim 14, further comprising:
when the determined transmission time point of the third encoded data packet is later than a preset limit time point, determining the transmission time point of the third encoded data packet as the fourth time point when the third encoded data packet is generated.

* * * * *